United States Patent [19]

Stengle, Jr. et al.

[11] 4,382,998
[45] May 10, 1983

[54] HEAT-RESISTANT MOLDING COMPOSITION AND MOLDED PARTS FOR HANDLING HOT GLASS ARTICLES

[75] Inventors: Edward J. Stengle, Jr., Toledo; Lester C. Minneman, Maumee, both of Ohio

[73] Assignee: Owens-Illinois, Inc., Toledo, Ohio

[21] Appl. No.: 271,479

[22] Filed: Jun. 8, 1981

[51] Int. Cl.³ ............................................. B32B 15/08
[52] U.S. Cl. .................................... 428/450; 252/12; 428/137; 428/138; 428/408; 428/323; 428/429; 428/447; 524/494; 524/495; 524/496; 524/588
[58] Field of Search .............. 428/244, 323, 266, 268, 428/429, 251, 450, 281, 408, 447, 137, 138; 524/400, 431, 860, 785, 788, 588, 494, 495, 496; 252/12

[56] References Cited

U.S. PATENT DOCUMENTS

| | | | |
|---|---|---|---|
| 3,002,862 | 10/1981 | Smith-Johannsen | 428/429 |
| 3,701,753 | 10/1972 | Shaw | 524/785 |
| 3,791,998 | 2/1974 | Bruns | 524/860 |
| 3,900,661 | 8/1975 | McCombs | 428/251 |
| 3,983,265 | 9/1976 | Letoffe | 428/429 |
| 4,110,095 | 8/1978 | Stengle | 252/12 |
| 4,246,313 | 1/1981 | Stengle | 428/266 |
| 4,286,013 | 8/1981 | Daroga | 428/266 |
| 4,316,930 | 2/1982 | Stengle | 428/268 |

FOREIGN PATENT DOCUMENTS

53-84081  7/1978  Japan .................................. 524/860

*Primary Examiner*—Ellis P. Robinson
*Attorney, Agent, or Firm*—Charles S. Lynch; Myron E. Click; David H. Wilson

[57] ABSTRACT

This invention relates to rigid solid-lubricant composite materials which are extremely heat and wear-resistant and are moldable and thermosetting when molded to shape for handling hot glass articles. The composition is comprised of an organic silicone resin having chopped glass fibers and a finely-ground graphite-containing material therein. The composition may be molded to shape by compression or transfer molding into conveyor parts, for example, for handling newly-formed hot glass articles without marring their surfaces.

10 Claims, 6 Drawing Figures

HEAT-RESISTANT MOLDING COMPOSITION AND MOLDED PARTS FOR HANDLING HOT GLASS ARTICLES

CROSS-REFERENCE TO RELATED APPLICATIONS

A related U.S. patent application is entitled, "Heat-Resistant Vacuum Pad and Method of Making Same", Ser. No. 196,419, filed Oct. 14, 1980. Another related U.S. patent application is entitled, "Improvements in the Manufacture of Glass Wherein Hot Metal Molds are Provided With a Solid Film Lubricant Layer", Ser. No. 562,554, filed Mar. 27, 1975, and refiled as Ser. No. 727,322, filed Sept. 27, 1976, the latter issued as U.S. Pat. No. 4,110,095 on Aug. 29, 1978, in the name of the same applicant. These U.S. patent applications are assigned to the same common assignee as the present application.

Still another related U.S. patent application is entitled "Heat-Resistant Composite Material and Method of Making Same", Ser. No. 2,831, filed Jan. 12, 1979, issued as U.S. Pat. No. 4,246,313, dated Jan. 20, 1981, in the name of the same applicant and assigned to the same common assignee as the present application.

BACKGROUND OF THE INVENTION

1. Field of the Invention

This invention generally relates to rigid solid lubricant composite materials which are extremely heat-resistant and are moldable and thermosetting, and comprised of an organic silicone resin having a finely-ground particulate filler therein. The composition is formed by taking an organopolysiloxane resin or mixture of such resins in a solvent, and dispersing a prescribed amount of finely-ground graphite-containing material therein, the combined materials being able to be molded into a rigid thermoset, heat-resistant solid-lubricant material adapted to handling hot glass articles. The molding composition may be molded into products having precisely-sized and shaped contours prior to heat-curing the shaped product containing the resin and filler material.

The composite molding composition may be molded into a wide variety of products for long-term handling of newly-formed, hot glass articles without marring their surfaces or creating objectionable emissions from the composite material due to excessive heat. The molding composition cures into a thermoset hardened condition with strengthening chopped glass fibers fully dispersed throughout. The molded products possess an appreciable degree of heat-resistance, and can be employed alone without any additional heat-resistant fluid or solid coating applied to their exterior surfaces for long-term, repeated use in handling of hot glass articles.

2. Description of the Prior Art

It has been common practice in the glass-forming art to fabricate or cover conveyor belting and hot glass transfer mechanisms for transporting hot glass articles with asbestos or asbestos-containing composite materials such as transite to provide heat-resistant surfaces which would not mar the glass and provide long-term operating life. Conveyor mechanisms, such as sweepout arms, curved chain members, lehr bars, takeout tongs, and the like, have required high-temperature resistant materials on their glass contacting surfaces. Also, bucket liners and sweep arm fingers have previously been fabricated with coverings of asbestos cloth for handling hot glass articles. It is desirable to eliminate the use of all asbestos and cloth coverings in such operations.

In the production of glassware, certain handling equipment has also been coated with graphite and petroleum oil swabbing compounds to provide lubricity and heat-resistance. In the use of such coatings, when the petroleum fraction flashes off, it can detract from effective lubrication during forming and emit undesirable emissions into the surrounding atmosphere.

The use of water-based carriers instead of the petroleum oil carriers for graphite and other lubricious materials have not been entirely satisfactory, primarily due to the high heat of varporization of water, and the resulting excessive cooling of the glass-handling equipment. In addition, it is difficult to controllably wet the handling equipment surfaces with water-based materials which are applied intermittently during production of glassware.

High temperature fabrics based on inorganic fibers, such as glass, silica, quartz, and ceramics, have been proposed as replacement materials for asbestos and high-temperature resistant parts for handling hot glass articles up to 1000° F. (538° C.). In glass manufacturing operations, such fabrics do not normally stand up well in long-term repeated contact with hot glass articles because of their low resistance to abrasion. In the manufacture of glass fibers, for example, chemical treatments (sizings) such as acrylic resin or starch coatings are used to reduce abrasion contact and fiber breakage during processing. These are organic and burn off in a high temperature environment, such as when handling hot glass articles, resulting in surface abrasion at the product/fabric interface and also within the fabric. Fabrics based on inorganic fibers exhibit the necessary heat-resistance for hot glass handling; however, such materials require a combination with high temperature solid lubricant coating technology to be functional. Both U.S. Pat. No. 4,246,313 to Stengle, issued Jan. 20, 1981, entitled, "Heat-Resistant Composite Material and Method of Making Same", and U.S. Pat. No. 4,110,095 to Stengle, issued August 1978, entitled, "Manufacture of Glass wherein Hot Metal Molds are Provided With a Solid Film Lubricant Layer", relate to handling hot glass, the former subsequent to and the latter during formation of hollow glass containers, and both are assigned to the same common assignee as the present application.

SUMMARY OF THE INVENTION

The present invention relates to a molding composition and solid-lubricant molded parts adapted to withstand high-temperature use. The composition involves a unique combination of materials, including a cured, thermoset, organopolysiloxane resin containing a fibrous filler of heat-resistant glass fiber material and a graphite component. The invention relates to rigid thermosetting composite materials which are extremely heat-resistant, which materials, in molded form, preferably have at least one continuous, wear-resistant, smooth surface for contacting the hot glass articles. The composition essentially comprises an organopolysiloxane resin having a finely-ground graphite-containing constituent and a glass fiber filler therein. The lubricant-type composition may be molded into precisely-sized and shaped contours of thermoset molded parts. The parts can be designed to replace metal ware-transfer conveyor mechanisms of many types. The parts are more heat and impact-resistant than many other single component molded parts with improved line performance over multi-component parts. The present solid-lubricant molding composition is particularly useful for molding molded-to-shape conveyor hardware, especially including those parts which are adaptable to flat top or table top metal conveyors.

Accordingly, an object of the present invention is to provide an improved solid-lubricant molding composition for fabricating molded parts for hot glass handling.

Another object of the present invention is to provide a solid-lubricant composite material for molded parts which provide long-term effectiveness in repeated contact with newly-formed hot glass articles.

Another object of the present invention is to provide improved hot-glass handling capability to existing conveyor mechanisms, and the like, by providing a moldable heat-resistant solid-lubricant thermosetting material, including a graphite-filled organopolysiloxane resin and a glass fiber, and graphite filler adapted to mold the glass contacting surfaces or components of such equipment.

Yet another object of the present invention is to provide a solid-lubricant composition of making a high-heat-resistant parts or components capable of repeated contact with hot glass articles over an extensive operating period without deterioration or surface wear of the components or deleterious marking of the glass articles.

Still another object of the present invention is to provide heat and wear-resistant solid-lubricant molded parts for glass handling systems, such parts being comprised of silicone resin, finely-divided graphite-type filler and chopped glass fibers in cured thermoset hardened condition adapted to long-term repeated handling of newly-formed hot glass articles.

These and other objects and features of the present invention will become apparent from the following detailed description.

DETAILED DESCRIPTION OF THE PREFERRED EMBODIMENT

Figure 1:
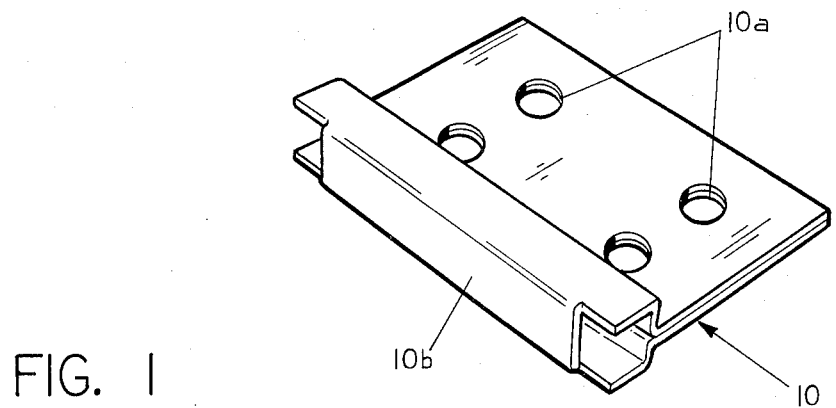
FIG. 1 is a perspective view of a metallic insert for a molded part for hot glass handling.

In the present invention, the solid-lubricant molding composition is one which can readily be molded by a wide variety of known molding processes such as by transfer or compression molding. The composition is an improved high-temperature material especially useful for application to hot glass conveyor manufacturing practices. The composition may be molded into many different shapes and contours for use as individual conveyor parts. The parts may be comprised of solely the below-described composition, or may be molded around metallic support or insert members to provide facing elements for hot glass handling.

The preferred form of the molding composition comprises the following constituents in weight percent:

|  | Range Weight % | Preferred Weight % |
| --- | --- | --- |
| Thermosetting Silicone Resin | 24.0–40.0 | 25 |
| Graphite | 15.0–25.0 | 20 |
| Chopped Glass Fibers | 1.0–55.0 | 49 |
| Carbon Powder | 0.0–10.0 | 5 |
| Amine Catalyst | 0.0–1.0 | 0.5 |
| Iron Oxide Pigment | 0.0–2.0 | 0 |
| Calcium Stearate Lubricant | 0.0–1.0 | 0.5 |

The composition is preferably comprised of major amounts of silicone resin, graphite powder and chopped glass fibers. Minor amounts of a suitable catalyst for the silicone resin, such as an amine catalyst, pigments and lubricants, are also used. The minor constituents may be varied widely as required for the molding operation.

The silicone resin component of the composition is based upon both methyl and phenyl silanes, preferably in a ratio of 1 to 1. The methyl-phenyl polysiloxane resin is a product of General Electric Company, Product No. SR-355, and is one of their low-viscosity casting resin products. The uncured product is a dry solid having a specific gravity of 1.08, has a softening point of 32° C. and becomes fluid at 93° C. The chopped glass fibers are preferably comprised of E filament fiber which is very fine and has great filling capability per unit weight, preferably having a length of about ¼ inch. The graphite component is preferably Wickes Corporation No. 205, pulverized graphite. The graphite component may be replaced in whole or in part with molybdenum disulfide or talc having similar friction reducing capability. The amine catalyst can be triethanol amine or other tertiary amine. The iron oxide pigment can be either black or red oxide, as desired, and other fine inorganic fillers may be used in minor amount as desired. The addition of the minor amount of carbon is preferred as a colorant and as a "getter" for the internal gases generated during molding which create molding problems, especially in molding large size parts or sheets. The product Monarch 700 of Cabot Corporation is preferred, being a furnace black carbon.

Examples of preferred materials for compression and transfer molding of component parts for glass-contacting parts of conveyor systems are the following:

|  | Compression Molding Weight % | Transfer Molding Weight % |
| --- | --- | --- |
| Thermosetting Silicone Resin | 25 | 35 |
| Graphite Powder | 20 | 20 |
| Chopped Glass | 49 | 38 |
| Silica (or Talc) | 0 | 5 |
| Carbon Powder | 5 | 1 |
| Amine Catalyst Iron Iron Oxide Pigment Calcium Stearate Lubricant | +1 | +1 |
|  | 100 | 100 |

The parts are molded as aforesaid having at least one smooth or planar surface. Where the parts are molded with a metallic insert, the molded material preferably has a minimum thickness ranging from about ⅛ to 3/16 inch. Where the parts are molded without a metallic insert, such as with several mounting apertures for attachment to a back-up member, the molded material preferably has a minimum thickness ranging from about ⅛ up to about ½ inch. The parts exhibit a low coefficient of friction and low heat-transfer characteristics to permit their repeated contact with hot glass articles.

Figure 2:
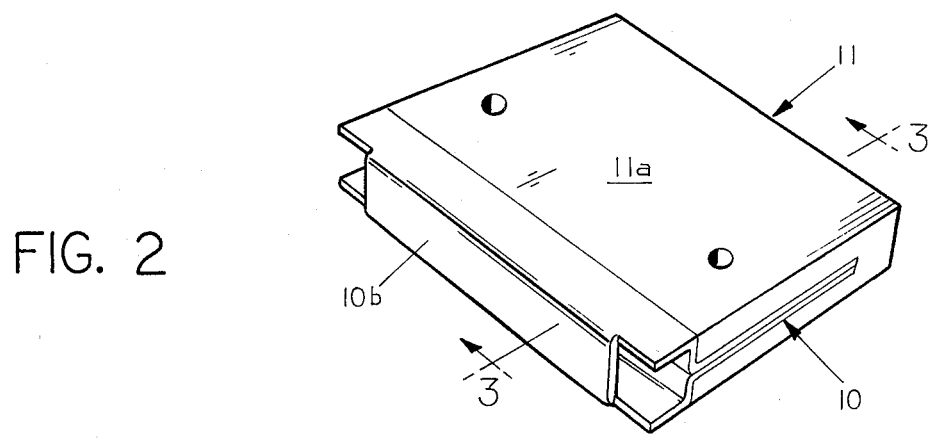
FIG. 2 is a perspective view of a molded part, including the metallic insert at least partially surrounded by the solid-lubricant molding composition.
Figure 3:
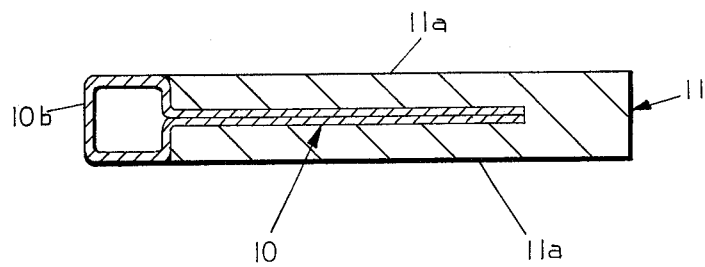
FIG. 3 is a vertical sectional view taken along the line 3—3 of FIG. 2.

As shown in FIG. 1, a metallic insert 10 comprises a folded-over metal stamping having a series of apertures 10a therein. Such insert is adapted to connection along one hollow edge 10b to a hot glass handling conveyor, for example. FIG. 2 shows the solid lubricant molding composition 11 molded around the double-folded portion of metallic insert 10. The composition is molded having parallel flat surfaces 11a for contacting hot glass. FIG. 3 shows the smooth exposed parallel surfaces 11a of the molding composition which passes through and fills the insert apertures during molding. Such construction serves to firmly lock the molded portion of the molding composition to the rigid insert for additional strength.

Figure 4:
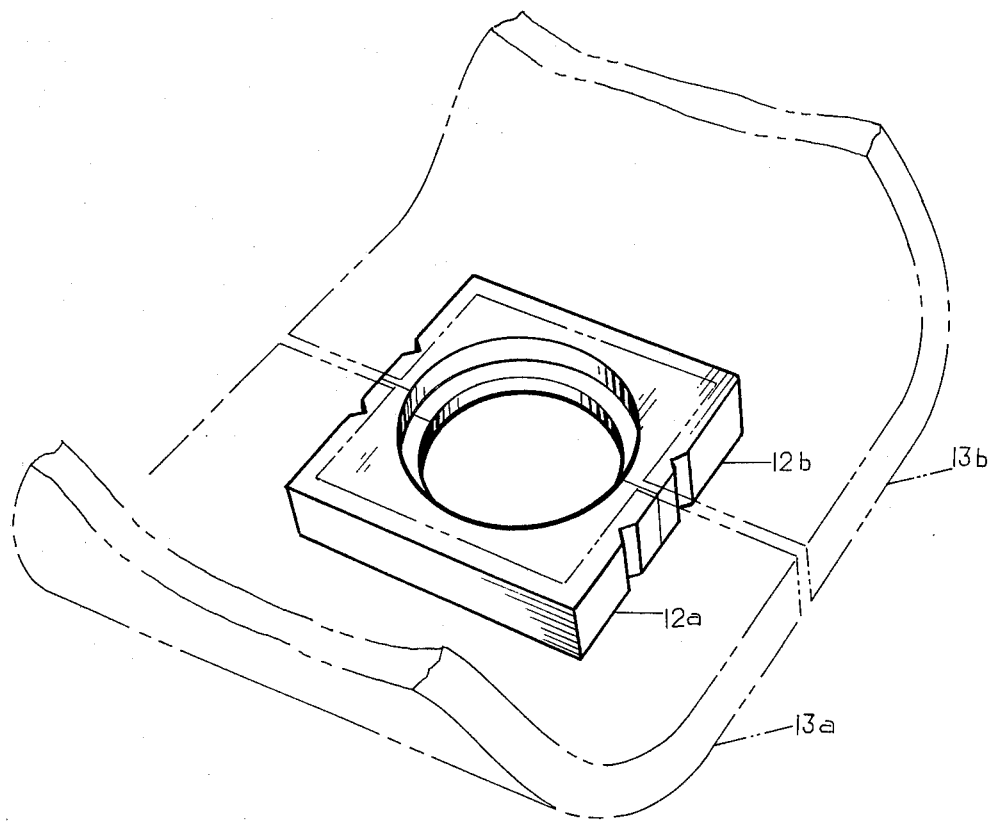
FIG. 4 is a perspective view of a pair of tong insert members formed of the solid-lubricant molding composition.

A pair of tong inserts 12a and 12b are shown in FIG. 4 which are molded to shape to fit within a pair of metal tong arms 13a and 13b, respectively. The tong inserts are molded of the subject molding composition in the form of flat, semi-circular members adapted to retain the finish portion of a hollow glass container immediately after its formation without detrimental marking of same. The inserts can be fitted into the tong arms and be held by set screws as replaceable elements.

Figure 5:
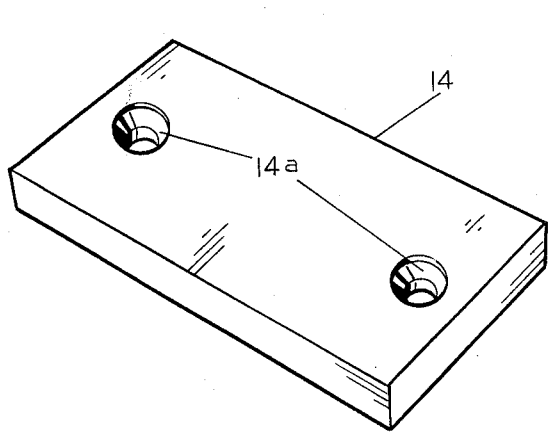
FIG. 5 is a perspective view of facing plate formed of the solid-lubricant molding composition.
Figure 6:
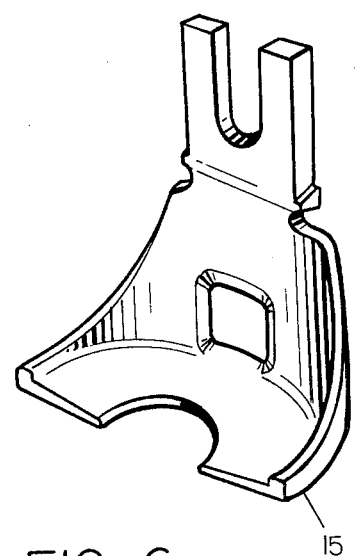
FIG. 6 is a perspective view of a tong member formed of the said molding composition.

FIG. 5 shows a flat plate-type of handling element 14 with apertures 14a therein for attachment to a backing member, the entire plate being formed of the molding composition. FIG. 6 shows a larger type of tong insert 15 molded entirely of the molding composition.

The graphite containing solid-lubricant molding compound exhibits high-temperature performance, medium impact strength, and low frictional characteristics. Major physical properties of the composition are as follows:

| PHYSICAL PROPERTIES OF THE COMPOSITION | |
|---|---|
| Color | Black |
| Bulk Factor | 6–8 |
| Molding Temp. (°F.) | 290–325 |
| Molding Pressure (PSI) | |
| Transfer | 500–2500 |
| Compression | 1000–5000 |
| Plasticity | Medium-Stiff |
| | (ASTM Cup Control) |

| PHYSICAL PROPERTIES OF MOLDED PARTS | | |
|---|---|---|
| PERMANENCE: | | |
| Specific Gravity | 1.997 | |
| Molding Shrinkage | | |
| in/in Compression | 0.0001–0.0010 | |
| Water Absorption (%) | | |
| 24 hrs at 23° C. | 0.29 | |
| 48 hrs at 50° C. | 0.76 | |
| MECHANICAL | | |
| | NO POST CURE | POST CURED |
| Impact Strength | | |
| (ft lbs/in, notch side) | 4.6 | 5.4 |
| Tensile Strength (PSI) | 2700 | 3000 |
| Flexural Strength (PSI) | 7200 | 7600 |
| Flexural Modulus (PSI) | $2.1 \times 10^6$ | $1.9 \times 10^6$ |
| Compression Strength (PSI) | 7300 | 8700 |

| -continued | |
|---|---|
| PHYSICAL PROPERTIES OF MOLDED PARTS | |
| Rockwell Hardness | |
| (M Scale) | 88 |
| THERMAL | |
| Coefficient of Linear Expansion | |
| (in/in/°C.) | |
| No Post Cure | $12.7 \times 10^{-6}$ |
| Post Cure | |
| (2 hrs at 300° F.) | $9.8 \times 10^{-6}$ |

The post cure operation may also involve heating the molded parts for 24 hours at 300° F.

The subject composition is especially useful for molding molded-to-shape conveyor hardware items, and the parts are particularly useful for flat-top and table-top metal conveyors for transporting hot glass articles. The composite is a high-temperature engineering material which can be incorporated into all types of equipment for hot glass handling. The material possesses a low heat-transfer property for a desirable glass contacting surface, low frictional properties for glass container support and stability, and excellent heat-resistance for handling hot glass up to 1000° F. to 1400° F. temperature in which the handling parts reach a temperature up to 800° F.

Many, if not all, of the glass contacting parts of the chain conveyor of a glass handling system can be partially or entirely made of the subject composition. The pusher plates and finger members, as well as the bolted-on plate members, can be so made by molding to shape. Such parts can also be machined to shape and/or bonded to metal holders with a suitable adhesive. The molded parts may be made with convenient apertures for mounting on holder members with bolts, or alternately bolt holes may be drilled in the molded parts.

The molded parts are normally tested for abrasion resistance using a Taber abraser. The Taber abraser utilizes abrasion wheels which are mounted to produce circular surface travel in contact with a flat test specimen under a given load. The test specimen drives the load moving in the same direction. Abrasion resistance is a function of weight loss after a given number of cycles.

The test specimen moves in the same direction and in the same plane as the abrasive wheel. On a glass machine conveyor, the glass container and transfer hardware also move in the same direction; particularly in the curved chain container conveyor and side-shift lehr bahrs. In each case, the transfer mechanism pad drives the container much in the same manner as the test specimen drives the abrasive wheel. The following test data correlate well with actual use requirements and confirm the improvement obtained with the use of graphite. Thus, the technology utilizes a solid lubricant which provides lubrication between moving surfaces under dry high-temperature conditions. The lubricant transfers from within the composite moving parts to reduce friction and improve wear resistance.

The wear test results on parts made of the preferred compression molding composition, and as obtained in the Taber abraser, using specimen both with and without graphite, are as follows:

| | Average of 5 Specimens - milligrams/1000 cycles |
|---|---|
| Sample #1 (w/o graphite) | 196.1 |
| Sample #2 (w/o graphite) | 235.4 |
| Sample #3 (w/graphite) | 89.0 |
| Sample #4 (w/graphite) | 75.5 |
| Sample #5 (pure polypropylene) | 7.4 |

The Taber abraser was arranged with a weight of 1000 grams operating through 1000 cycles in a time period of about 20 minutes, using CS-19 calibrase abrasion wheels. The sample of pure polypropylene was included to show the effect of the various fillers on wear. The weight loss indicates the substantial reduction in wear when graphite is included as a high-temperature lubricant in the molding composition. Simply stated, the inclusion of graphite in the composition provides about three times more wear resistance over known compositions without graphite in equivalent hot glass handling operations.

The hardness of the molded material as determined by a Shore Scleroscope is slightly lower with the graphite addition. The hardness compares favorably with commercial grade carbon materials used for hot glass handling.

The flexural strength of the material is only slightly changed with the graphite addition. The flexural strength is considerably greater than for carbon materials used for hot glass handling. The graphite addition to the base composition lowers the compressive strength over that of the composition without graphite; however, the value is more than adequate for the intended use.

In the case of thermal conductivity, the graphite addition causes a negligible increase over the composition without graphite. The value is very low and lower than carbon materials used for hot glass handling.

The properties of low coefficient of friction and wear-resistance are most significant in the subject molding composition. The solid lubricant property provides lubrication between moving surfaces under dry conditions, as well as at high temperatures ranging up to about 800° F. The lubricant transfers from within the composite to the interface between the moving parts on a continuous basis to provide lubrication and improve wear-resistance. The contacted surfaces of the glass articles are not adversely affected and remain free of checks or blemishes.

Various modifications may be resorted to within the spirit and scope of the appended claims.

We claim:

1. A moldable thermosetting composite material for handling newly-formed hot glass articles, and the like, comprising the following constituents in weight percentage:

| Thermosetting | Range Weight % |
|---|---|
| Silicone Resin | 24.0–40.0 |
| Graphite | 15.0–25.0 |
| Chopped Glass Fibers | 1.0–55.0 |
| Carbon Powder | 0.0–10.0 |
| Amine Catalyst | 0.0–1.0 |
| Iron Oxide Pigment | 0.0–2.0 |
| Calcium Stearate Lubricant | 0.0–1.0 | said material in molded form having properties of high temperature-resistance, medium impact strength and low coefficient of friction.

2. A heat-resistant thermoset-hardened heat-cured molded article for handling newly-formed hot glass products, and the like, comprising the following constituents in weight percentage:

| Thermosetting | Range Weight % |
|---|---|
| Silicone Resin | 24.0–40.0 |
| Graphite | 15.0–25.0 |
| Chopped Glass Fibers | 1.0–55.0 |
| Carbon Powder | 0.0–10.0 |
| Amine Catalyst | 0.0–1.0 |
| Iron Oxide Pigment | 0.0–2.0 |
| Calcium Stearate Lubricant | 0.0–1.0 | said article having at least one generally-planar surface and having properties of high-temperature resistance, medium impact strength and low coefficient of friction.

3. A heat-resistant molded article in accordance with claim 2 wherein said planar surface comprises the hot glass handling surface.

4. A heat-resistant molded article in accordance with claim 2, wherein said graphite powder comprises about 20 weight percent.

5. A heat-resistant molded article in accordance with claim 2, wherein said silicone resin is comprised of methyl and phenyl silanes in a ratio of about 1 to 1.

6. A heat-resistant molded article in accordance with claim 2, wherein said article is comprised of a rigid interior metallic component and a rigid exterior thermosetting composite material compound, said components being firmly joined into a unitary structure.

7. A heat-resistant molded article in accordance with claim 2, the hot-glass-contacting planar surface of said article being capable of withstanding long-term operating temperatures up to about 800° F.

8. A heat-resistant molded article in accordance with claim 2, wherein said article has a pair of opposing exterior parallel planar surfaces adapted to reversible long-term use in contacting hot glass articles.

9. A heat-resistant thermoset-hardened heat-cured molded article for handling newly-formed hot glass products, and the like, comprising the following constituents by weight:

| | AMOUNT WEIGHT % |
|---|---|
| Thermosetting | |
| Silicone Resin | 25 |
| Graphite | 20 |
| Chopped Glass Fibers | 49 |
| Carbon Powder | 5 |
| Amine Catalyst | 0.5 |
| Calcium Stearate Lubricant | 0.5 | said article being molded by compression molding and having at least one generally-planar surface, and having properties of high-temperature resistance, medium impact strength and low coefficient of friction.

10. A heat-resistant thermoset-hardened heat-cured molded article for handling newly-formed hot glass products, and the like, comprising the following constituents by weight:

|  | AMOUNT WEIGHT % |
|---|---|
| Thermosetting Silicone Resin | 35 |
| Graphite | 20 |
| Chopped Glass Fibers | 37.5 |
| Silica Powder | 5 |
| Carbon Powder | 1 |

-continued

|  | AMOUNT WEIGHT % |
|---|---|
| Amine Catalyst | 0.5 |
| Calcium Stearate Lubricant | 0.5 | said article being molded by transfer molding and having at least one generally-planar surface, and having properties of high-temperature resistance, medium impact strength and low coefficient of friction.

* * * * *

UNITED STATES PATENT AND TRADEMARK OFFICE
CERTIFICATE OF CORRECTION

PATENT NO. : 4,382,998
DATED : May 10, 1983
INVENTOR(S) : Edward J. Stengle, Jr. and Lester C. Minneman It is certified that error appears in the above-identified patent and that said Letters Patent are hereby corrected as shown below:

Col. 2, line 14, "varporization" should be "vaporization";
Claim 1, delete "Thermosetting" from Table Heading and insert same above "silicone resin" in Table itself.
Claim 2, delete "Thermosetting" from Table Heading and insert same above "silicone resin" in Table itself.

Signed and Sealed this

Twenty-eighth Day of June 1983

[SEAL]

Attest:

GERALD J. MOSSINGHOFF

Attesting Officer  Commissioner of Patents and Trademarks